United States Patent [19]

Marchand

[11] Patent Number: 4,550,563

[45] Date of Patent: Nov. 5, 1985

[54] GAS TURBINE COMBUSTION SYSTEM UTILIZING RENEWABLE AND NON-CRITICAL SOLID FUELS WITH RESIDUE REMOVER TO MINIMIZE ENVIRONMENTAL POLLUTION

[76] Inventor: William C. Marchand, 11339 Roxbury, Detroit, Mich. 48224

[21] Appl. No.: 642,728

[22] Filed: Aug. 17, 1984

Related U.S. Application Data

[60] Continuation of Ser. No. 393,978, Jun. 30, 1982, abandoned, Division of Ser. No. 96,760, Nov. 23, 1979, Pat. No. 4,338,782.

[51] Int. Cl.⁴ .................................................. F02C 3/26
[52] U.S. Cl. ............................... 60/39.06; 60/39.464; 110/264; 110/347
[58] Field of Search ............. 60/39.06, 39.463, 39.464, 60/39.826, 744, 745; 110/232, 264, 347; 431/9, 168

[56] References Cited

U.S. PATENT DOCUMENTS

| | | | |
|---|---|---|---|
| 1,591,679 | 7/1926 | Hawley | 110/347 |
| 1,618,808 | 2/1927 | Burg | 60/39.464 |
| 1,910,735 | 5/1933 | Zikesch | 110/264 |
| 2,699,039 | 1/1955 | Yellott | 60/39.464 |
| 2,888,804 | 6/1959 | Yellott et al. | |
| 2,900,930 | 8/1959 | Cermak | 110/264 |
| 4,338,782 | 7/1982 | Marchand | 60/39.464 |
| 4,457,695 | 7/1984 | Kummel | 110/264 |

FOREIGN PATENT DOCUMENTS

279770  11/1927  United Kingdom ............. 60/39.463

Primary Examiner—Louis J. Casaregola
Attorney, Agent, or Firm—Remy J. VanOphem

[57] ABSTRACT

Pressurized comminuted solid fuel particles are mechanically reground in a fuel injector prior to being radially injected in a swirling motion into a combustor where the fuel is mixed with oxidizing fluid in a swirling motion that is opposite to the swirling motion imparted to the solid fuel particles and burned to form both solid and gaseous products of combustion. The products of combustion are passed through an inertia separator where the solid products of combustion are removed by inertia. Means are also provided for injecting liquid or gaseous fuels into the combustor to assist in the combustion process and in meeting varying load demands on the engine.

16 Claims, 10 Drawing Figures

GAS TURBINE COMBUSTION SYSTEM UTILIZING RENEWABLE AND NON-CRITICAL SOLID FUELS WITH RESIDUE REMOVER TO MINIMIZE ENVIRONMENTAL POLLUTION

CROSS-REFERENCE TO RELATED APPLICATIONS

This is a continuation of application Ser. No. 393,978 filed June 30, 1982 now abandoned, and a division of Ser. No. 096,760 filed Nov. 23, 1979 now U.S. Pat. No. 4,338,782, issued July 13, 1982.

FIELD OF THE INVENTION

This invention relates to steady flow combustion systems and more particularly to a method and an apparatus for the combustion of a fluidized stream of finely comminuted or pulverized solid fuels in a gas turbine and for achieving improved particulate control by an inertia separation system so as to minimize turbine abrasion and environmental pollution.

BACKGROUND OF THE INVENTION

The United States consumes approximately thirty percent of the world's annual energy supplies. About ninety-three percent of our energy requirements are provided by fossil fuels, of which nearly half are from crude oil sources. Since crude oil production in the United States has been falling off since reaching a peak in 1972–1973, crude oil is supplied largely from the Middle East. Recent events in the Middle East have sharply focused attention on our overdependence on foreign crude oil supplies and have made apparent our need to develop alternate energy sources. Thus, our attention has focused on finding renewable or noncritical forms of energy to replace our current foreign crude oil supplies. Perennial growth matter such as wood, cotton trash, corn stalks, wheat chaff, forest residues, alfalfa, sunflower stalks, weeds, leaves, and other similar vegetation are in the category of renewable energy sources. Coal, because of its abundance here in the United States, is considered a noncritical energy form. The widespread utilization of both the renewable and noncritical energy supplies has been hampered by a lack of suitable means by which we can directly convert these energy supplies to useful work in such applications as automobiles, aircraft, locomotives, trucks, buses, electric generators, pumps, etc. A most convenient energy conversion device with multi-fuel capabilities is a gas turbine engine.

The direct injection of solid fuels into gas turbine combustion systems requires proper preparation of the fuels prior to burning and the removal of combustion residues, which have a detrimental affect on the turbine blades. In order to burn solid fuels in gas turbine systems, it has been found that the solid fuels must be ground, shredded or pulverized to an appropriate powder size.

The direct injection of solid fuels into gas turbine combustion systems dictates that the solid fuels be burned quickly and completely. It has also been found that considerable complexity and expense is incurred in the removal of combustion residues in order to protect turbine blades from abrasion. This is particularly true if coal is employed as a fuel in a gas turbine engine. It has been found that it is only necessary to remove the larger residues because solid particles of micron size have minimal influence on turbine blade abrasion.

Several prior art designs have unsuccessfully attempted to solve the problem of solid fuel combustion and the effective removal of large combustion residues from the hot gas flow field so as to mitigate turbine blade erosion.

In U.S. Pat. Nos. 2,625,791 and 2,651,176 are described gas turbine combustion systems utilizing solid fuel injection as well as the removal of the harmful solid residues from the products of combustion. In each design, the combustion system includes a pressurized fuel inlet for comminuted fuel incorporating a pneumatic pulverizing device and preheating means for simultaneously heating the fluidized solid fuel stream downstream of the pneumatic pulverizing device and adding a supplementary accelerated stream of heated air to the solid fuel stream. This air and fuel mixture is then discharged into a combination preheater and cyclonizer to effect further disintegration and devolutilization of the solid fuel. From the cyclonizer, this combustible fluid is injected into the center of a vertically disposed combustor. Combustion air is fed tangentially into the combustor through two feed zones. The first feed zone is designed to provide a quantity of air sufficient to completely burn the fuel injected into the combustor. The second feed zone is designed to reduce the temperature of the products of combustion, including the residues, to an operative optimum for the turbine blades. Downstream of the combustor, a discharge pipe with a foraminous screen is covered with a deflector plate to form a residue separator. Further downstream of this residue separator is a battery of small cyclone separators for discharging clean combusted air into the turbine section of the gas turbine.

In U.S. Pat. Nos. 2,888,804 and 2,911,065 are described further improvements in a gas turbine combustion system utilizing solid fuel injection and solid residue removing equipment. In each design, the combustion system therein described is a horizontally disposed combustor with a horizontally disposed fuel injector, which is concentrically mounted in the combustor. The fuel injector includes an inner fuel oil supply line and a nozzle, an annular air duct surrounding the fuel oil supply line and nozzle and a third annular duct wherein airborne pulverized coal is discharged tangentially into the annulus between the second and third annular duct. In the combustor, combustion air is staged into the combustor to mix with the fuel emitted from the fuel injector to form a fluidized gaseous stream containing combustion residues. Downstream of the fuel injector and mounted to the end of the combustor, is a terminal mixing and discharge section whereby the fluidized gaseous stream is diluted with cooler air to lower the temperature of the fluidized gaseous stream to the optimum turbine operating temperature. The fluidized gaseous stream and the combustion residues are then discharged from the combustor and are projected against a curveform louvered upper surface of a plenum chamber. Cooler air flows through the louvered opening to quench the combustion residues impinging against it. The fluidized gaseous stream and combustion residues are then passed through a battery of vortex separators, with the result that the combustion residues are trapped, removed, cooled and discharged from the fluidized gaseous stream. The cleaned fluidized gaseous stream is then discharged against the turbine blades.

All of the aforesaid designs were complicated and none were able to quench all of the combustion residues, with the result that the combustion residue separators melted and burned out. In addition, none of the aforesaid designs considered the use of other renewable sources of energy, such as those in the category of perennial growth vegetation.

A more recent design is shown in U.S. Pat. No. 4,089,631, wherein gas-fluidized ground coal and coal dust slurred with fuel oil are supplied to a pressurized slagging reverse flow cyclone combustor. The combustor has a relatively long axial length in order to achieve good separative efficiency of the small particulates from the flow field. In addition, a base purge and a conical vortex shield are incorporated in the combustor to inhibit reentrainment of fly ash into the exiting vortex core. Clean combustion air is admitted centrally into the cyclone combustor while gas-fluidized ground coal is introduced into the cyclone combustor near the cyclone wall in a relatively minor proportion of the total combustion air to produce a hot gas temperature in the range of 2600 degrees to 2900 degrees Fahrenheit. The combustion process is such that the coal particulates, because of their swirling motion, move rapidly outwardly into the wall burning zone of the combustion chamber, and the molten ash in the bottom of the combustion chamber tends to entrain fly ash particles from the wall burning zone of the chamber. This design is large, bulky, and would not be easily incorporated in a mobile gas turbine power plant that must be lightweight and compact. Furthermore, a turbine system incorporating this combustion scheme must operate at very high combustion temperatures in order to form slag, which is required to entrain fly ash particles in order to assist in the clean-up of the combustion gas flow field. In addition, this concept requires using fuel oil in order to entrain small coal dust particles in a fuel slurry to enhance particulate control in the combustor.

SUMMARY OF THE INVENTION

The present invention relates to improvements in the direct utilization of solid fuels in gas turbine combustion systems which incorporates a combustion residue removal scheme for reducing turbine blade abrasion and minimizes environmental pollution. One improvement is the further repulverization of the pulverized solid fuel at the fuel injector tip and the radial injection of the repulverized solid fuel into the combustor in a swirling motion. Another improvement is the incorporation of an inertia separator design which will withstand a broad range of optimum turbine operating temperatures and will also trap and remove harmful residues from the fluidized gaseous stream and further which is simple, effective and inexpensive. A still further improvement is the ability of this design to operate effectively over a broad range of optimum turbine operating temperatures without the need for a slurry or the need to form a slag.

In accordance with the invention, an apparatus for burning solid fuel with air and for removing solid residues from the gaseous products of combustion is characterized by a combustion chamber, an ignition source mounted to the combustion chamber, and means for repulverizing the powdered solid fuel to a predetermined particle size and for radially injecting the repulverized powdered fuel into the combustion chamber in a swirling motion. In addition, means are provided for supplying preheated air into the combustion chamber so that the preheated air mixes with the swirling pulverized powdered fuel and is ignited by the ignition source so as to form gaseous products of combustion and solid residues suspended in the gaseous products of combustion. Finally, means are provided for separating solid residues from the gaseous products of combustion.

Accordingly, one object of the invention is to enhance the combustion of the pulverized solid fuel by further repulverizing the pulverized solid fuel to a predetermined particle size in the fuel injector, to radially inject the repulverized powdered fuel into the combustion chamber in a swirling motion and to remove harmful residues from the products of combustion.

Another object is to provide a method and an apparatus for the metering and direct radial injection of the repulverized solid fuel into gas turbine combustion systems, operable over a broad range of optimum turbine operating temperatures, speeds and loads with minimal turbine blade abrasion.

Still another object is to provide a method and an apparatus for the metering, the repulverizing and the direct radial injection of the repulverized solid fuel into a gas turbine combustion system which is simple and inexpensive, operates over a broad range of turbine operating temperatures and provides for the removal of combustion residues in an inertia separator in order to minimize turbine blade abrasion.

A further object is to radially inject pulverized solid fuels for burning in gas turbine combustion systems inexpensively and compactly, without the need for forming fuel slurries or hot slag, to remove the solid fuel residues from the products of combustion.

A still further object is to provide a method and an apparatus for metering the direct injection of pulverized solid fuels by further repulverizing powdered fuel to break up and declog agglomerated powdered fuel in the fuel injector and to radially inject the solid fuel into the combustion chamber in a swirling motion so as to enhance the burning of the fuel with oxidizing fluid over a broad range of turbine operating temperatures and to remove the harmful fuel residues in the products of combustion in a separator such as to minimize turbine blade abrasion.

A still further object is to radially inject relatively small solid fuel particles, in a swirling motion, into a gas turbine combustion system for rapid combustion with swirling oxidizing fluid over a broad range of optimum turbine operating temperatures and to provide for the removal of combustion residues in an inertia separator, so as to minimize turbine blade abrasion.

A still further object is to enhance the combustion of pulverized solid fuels in gas turbine combustion systems by the further repulverizing of agglomerated pulverized fuel particles in the fuel injector, to meter and radially inject the reground pulverized fuel into the combustor in a swirling motion for rapid burning with swirling oxidizing fluid and to pass the swirling products of combustion through a separator to remove harmful solid residues, so as to minimize turbine blade erosion efficiently, compactly and inexpensively.

Still another aspect of the invention is the ability to use solid and fluid fuels whereby the fluid fuel is burned with oxidizing fluid and the solid fuel is repulverized and the fuels are radially injected into a gas turbine combustion chamber in a swirling motion so as to enhance the burning of the fuels with oxidizing fluid, which is swirling in the opposite direction in the combustion chamber, over a broad range of optimum turbine operating temperatures and to provide for the removal of combustion residues to minimize turbine blade erosion.

DETAILED DESCRIPTION OF THE PREFERRED EMBODIMENT

Figure 1:
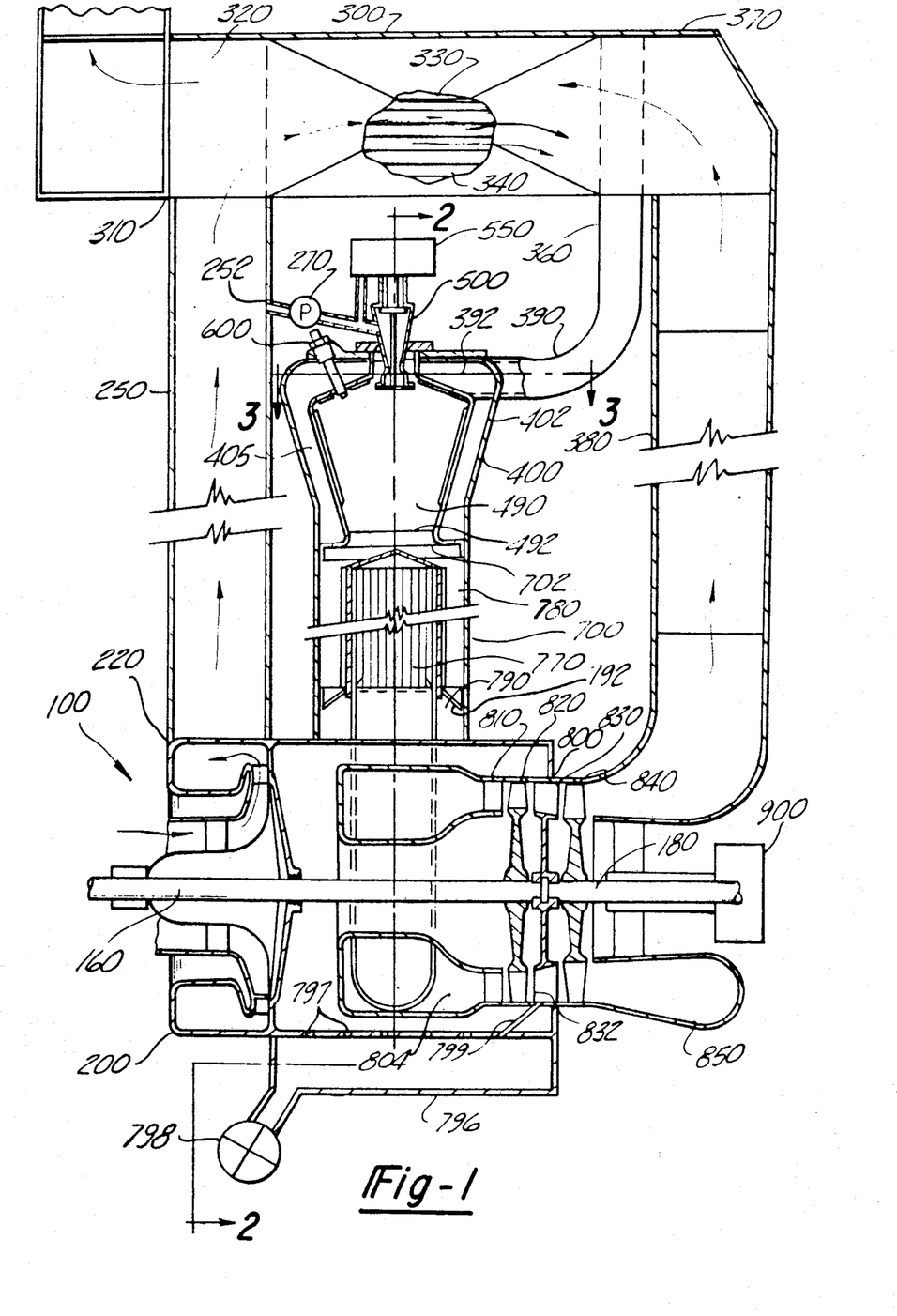
FIG. 1 is a sectional partial view of a gas turbine system employing the combustion system and residue removing arrangement of the invention.

Referring to FIG. 1, a gas turbine power plant generally designated as 100 is illustrated. The gas turbine power plant 100 includes in spaced relationship a compressor 200, a heat exchanger 300, a combustor 400 disposed in a combustor housing 402, a fuel injector 500, a fuel control 550, an ignitor 600, an inertia separator 700, and a turbine 800. The turbine 800 includes a nozzle 810, a gas generator turbine 820, a stator 830 and a power turbine 840. The gas generator turbine 820 is connected to a shaft 160 which is connected to the compressor 200. The gas generator turbine 820 provides power to drive the compressor 200. The power turbine 840 is connected to a shaft 180 which is connected to an external load means 900 (i.e. a generator, pump, transmission, compressor, fan, propeller, etc.). The power turbine 840 provides power to drive the external load means 900.

Figure 2:
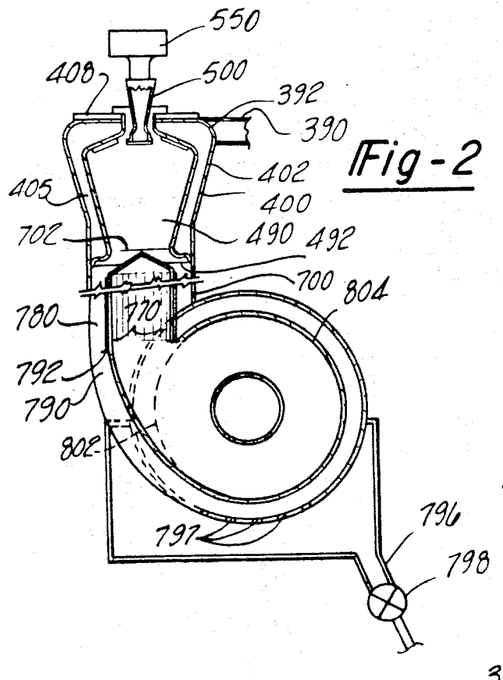
FIG. 2 is a sectional view of the combustion system, the residue removing arrangement of the invention and the turbine inlet scroll taken along line 2—2 of FIG. 1.
Figure 3:
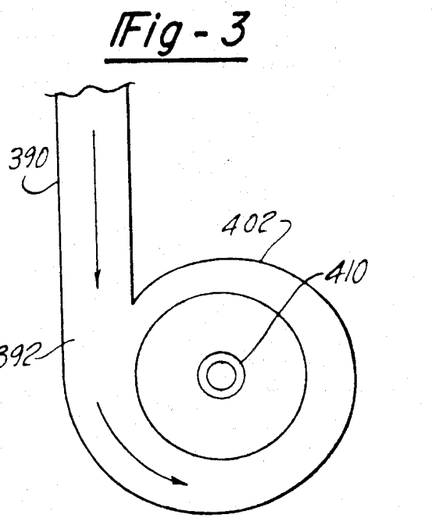
FIG. 3 is a sectional view of the oxidizing fluid tangential entry inlet to the combustor of the invention.

Oxidizing fluid is drawn into the compressor 200 where the oxidizing fluid is compressed. A tubular conduit 250 connects a discharge portion 220 of the compressor 200 to a fluid inlet header 310 of the heat exchanger 300. The heat exchanger 300 consists of a plurality of passages 340 which connect the fluid inlet header 310 with a fluid exhaust header 360. An exhaust duct 380 connects an exhaust outlet 850 of the power turbine 840 with an exhaust inlet header 370 of the heat exchanger 300. The exhaust inlet header 370 is connected to an exhaust outlet header 320 by means of a plurality of passages 330 in the heat exchanger 300. The oxidizing fluid from the tubular conduit 250 is heated in the passages 340 by the exhaust gases from the exhaust duct 380 as they pass through the passages 330. An inlet duct 390 connects the fluid exhaust header 360 of the heat exchanger 300 with the combustor housing 402 through a tangential entry port 392 to impart swirl into the oxidizing fluid, as shown in FIGS. 1, 2 and 3.

As shown in FIGS. 4, 6, 7, and 8, the combustor 400 includes a housing 402 and a cylindrical tube 410 which is mounted to a truncated conically shaped dome 420 which is fastened by conventional means to a secondary tube section 430. The dome 420 is formed with a plurality of radial louvers 422 and slots 424, as shown in detail in FIGS. 6 and 7. The secondary tube section 430 is formed with a plurality of axial or longitudinal louvers 432, as shown in detail in FIGS. 4, 6 and 8. The louvers 422 and 432 and the slots 424 serve to inject swirling oxidizing fluid from a flow passage 405, formed between the combustor housing 402 and the combustor 400, into an interior flow passage 490 of the combustor 400. The louvers 422 and 432 further serve to assist the swirl in the fluid from the flow passage 405 into the interior flow passage 490 of the combustor 400. The dome 420 further has an ignitor hole 426 drilled therethrough. The louvers 422 and 432 are in a predetermined position with respect to the tangential entry port so that the swirling oxidizing fluid in the flow passage 405 is continued in the same swirl direction in the interior flow passage 490 of the combustor 400.

Figure 4:
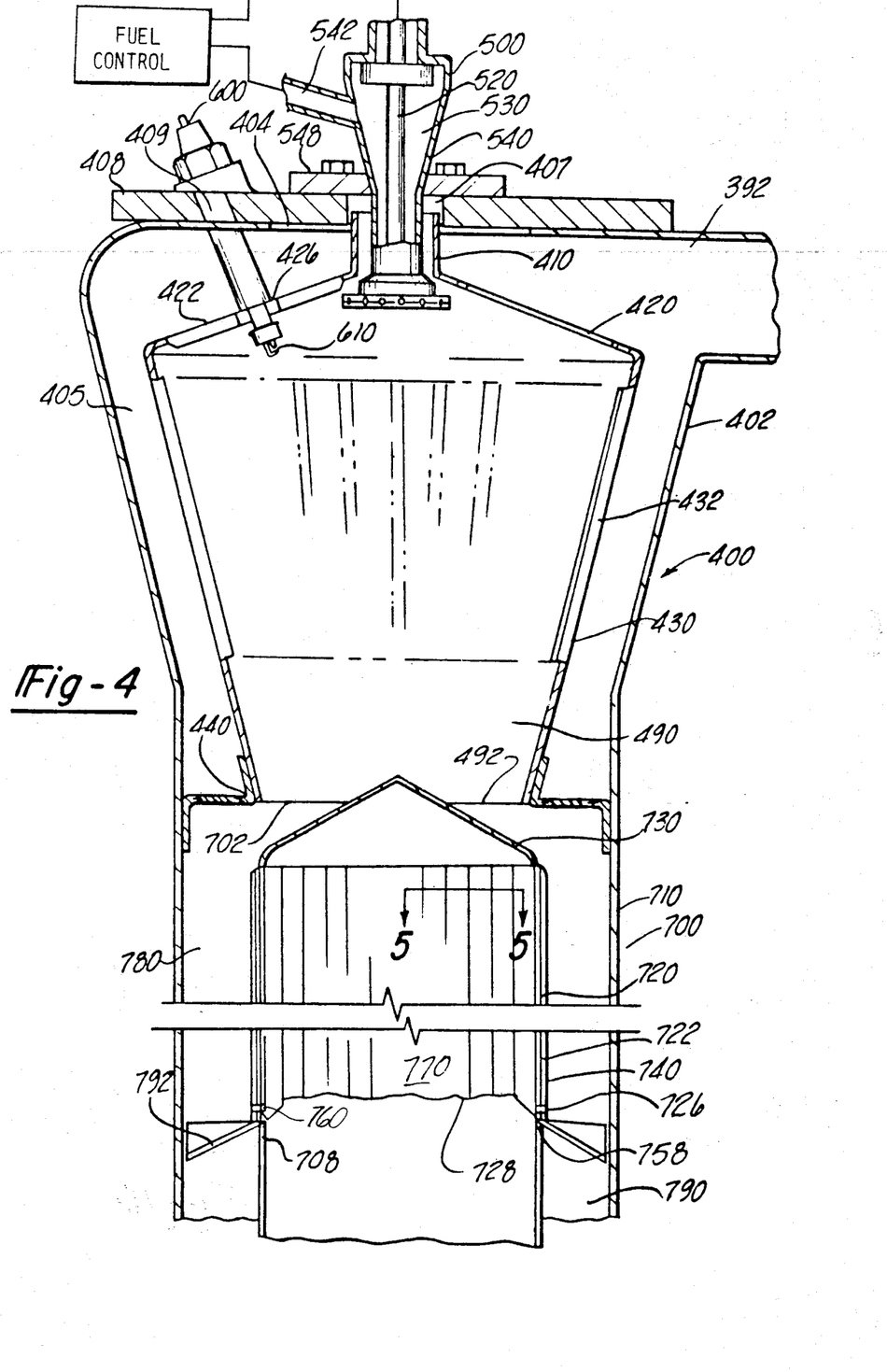
FIG. 4 is an enlarged sectional view of the combustion system and the residue removing arrangement of this invention.

As shown in FIG. 4, the combustor housing 402 has an opening 404 near the tangential entry port 392. A cover plate 408 is disposed over the opening 404 and is mounted to the combustor housing 402 as by conventional fastening means. The cover plate 408 further has an opening 407.

The cylindrical tube 410 of the combustor 400 is inserted into the opening 407 in the cover plate 408. The cylindrical tube 410 of the combustor 400 is attached to the cover plate 408 by conventional fastening means.

The cover plate 408 further has an aperture 409. An ignitor 600 is inserted into the aperture 409 and is fastened to the cover plate 408 by conventional fastening means. The tip 610 of the ignitor 600 protrudes through the ignitor hole 426 into the combustor 400. The ignitor 600 serves as the ignition source for any fuel introduced into the combustor 400.

The fuel injector 500 is inserted into the cylindrical tube 410 of the combustor 400.

Figure 9:
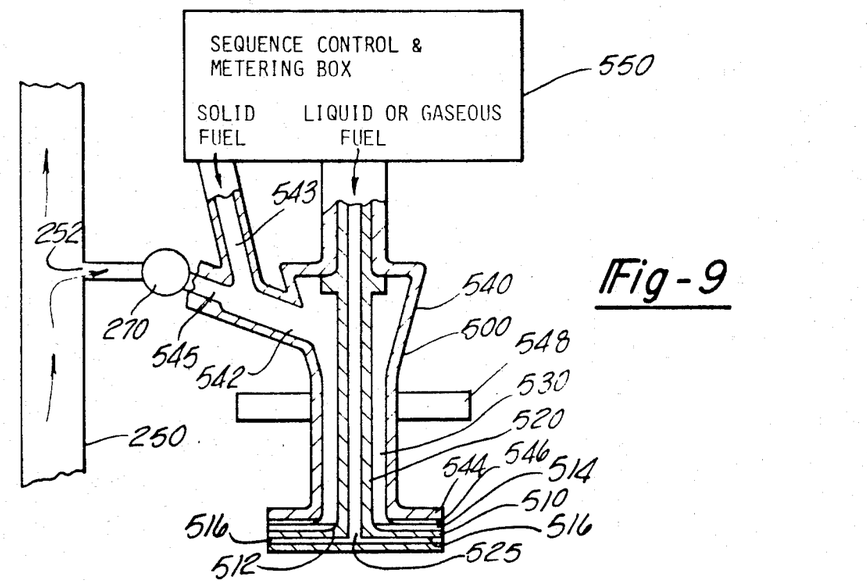
FIG. 9 is an enlarged sectional view of the injector.

As shown in FIGS. 4 and 9, the fuel injector 500 includes an inner body member 520 and an outer tube 540. Between the inner body member 520 and the outer tube 540 is an annular chamber 530. A solid fuel supply inlet port 542 is formed near one end of the outer tube. Pressurized, metered fluid comminuted solid fuel supplied from a solid fuel pulverizer (not shown) coupled with metered pressurized fluid, which entrains the pulverized or shredded solid fuel, is supplied to the fuel injector 500 at the solid fuel supply inlet port 542 at a predetermined fluid pressure, which is higher than the fluid pressure in the interior flow passage 490 of the combustor 400. The inner body member 520 of the fuel injector 500 is rotatably mounted to the outer tube 540 at one end by torque input means (i.e. electric motor drive, mechanical drive, hydraulic drive, etc.) A disc 510 is welded or fastened by any suitable means to the other end of the inner body member 520. The other end of the outer tube 540 terminates with a flange 544 which has a plurality of first serrations 546 formed on the surface. The disc 510 has a disc surface 512 which has a plurality of second serrations 514 formed thereon. The second serrations 514 formed on the disc surface 512 are aligned axially and radially in working relationship with respect to the first serrations on the surface of the flange 544.

The pressurized fluid comminuted solid fuel is further repulverized within the fuel injector 500 when the disc surface 512 rotates relative to the flange 544 of the outer tube 540 when the solid fuel particles lodge in the first and second serrations 546 and 514. Furthermore, since the fluid comminuted solid fuel is supplied to the fuel injector 500 at a fluid pressure that is higher than the fluid pressure at the interior flow passage 490 of the combustor 400, the fluid pressure differential across the first and second serrations 546 and 514 and the rotation of the disc surface 512 causes the repulverized solid fuel to be radially injected into the interior flow passage 490 of the combustor 400 in a swirling motion that is opposite to the swirling motion imparted to the oxidizing fluid from the radial and longitudinal louvers 422 and 432.

The fuel injector 500 further has a fuel flow passage 525 in the inner body member 520. The fuel flow passage 525 terminates before the disc surface 512. The fuel flow passage 525 is connected with the interior flow passage 490 of the combustor 400 by a plurality of holes 516 radially drilled through the disc 510. The fuel flow passage 525 permits the flow of liquid or gaseous fuel therethrough for distributing the fuel radially out of the holes 516 into the interior flow passage 490 of the combustor 400.

The fuel injector 500 further has a mounting flange 548 which is welded or brazed to the outer tube 540 at a predetermined distance from the disc 510. The fuel injector 500 is inserted through the cover plate 408 and the cylindrical tube 410 of the combustor 400, and the mounting flange 548 is fastened to the cover plate 408 by conventional fastening means.

As shown in FIG. 9, the fuel control 550 meters the supply of solid pulverized fuel into a first leg 543 of the solid fuel supply inlet port 542. A second leg 545 of the solid fuel supply inlet port 542 is connected to an oxidizing fluid pressure booster 270 which is connected to the tubular conduit 250 at 252 to supply a metered supply of oxidizing fluid at the second leg 545. The solid fuel in the first leg 543 is entrained by the oxidizing fluid in the second leg 545 of the solid fuel supply inlet port 542 so that pressurized fluid comminuted solid fuel enters into the annular chamber 530 of the fuel injector 500. The fuel control 550 also meters a supply of liquid or gaseous fuel into the fuel flow passage 525 of the fuel injector 500 for starting or for supplementing the solid fuel supply, as required.

Figure 5:
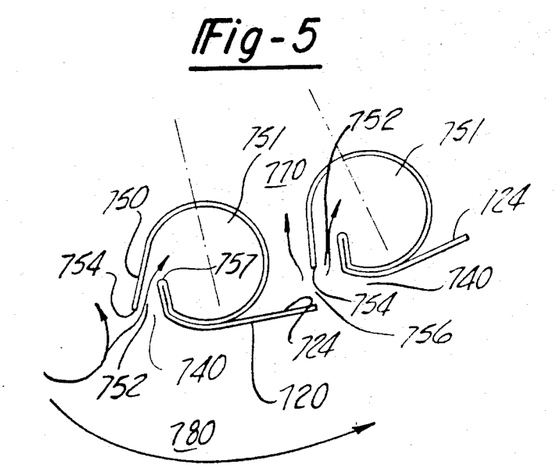
FIG. 5 is a sectional view taken along line 5—5 of FIG. 4.

As shown in FIG. 4, a terminal end 492 of the secondary tube section 430 of the combustor 400 is inserted in a seal 440 so that the interior flow passage 490 of the combustor is connected to an inlet 702 of a housing 710 of the inertia separator 700. The inertia separator has a hollow cylindrical tube 720 with a truncated dome 730 connected thereto. An outer flow passage 780 is formed between the housing 710 and the hollow cylindrical tube 720. The hollow cylindrical tube 720 has a plurality of longitudinal slots 740 formed about the outer periphery 722 thereof. A plurality of longitudinal separator tubes 750 are connected longitudinally to the hollow cylindrical tube 720 along nearly the entire length of the inside surface 724 of the hollow cylindrical tube 720, as shown in FIG. 5. The longitudinal separator tubes 750 are formed with a flow passage 751 and with a longitudinal first opening 752 along the entire length of the longitudinal separator tube 750 near the longitudinal slots 740. The longitudinal first opening 752 is formed between the edge 754 that forms the longitudinal separator tube 750 and an edge 757 on the tube 750. A gap 756 is formed between the edge 754 and the inner surface 724 of the hollow cylindrical tube 720. The first opening 752 and the gap 756 are formed in the separator 700 in a predetermined relationship to the swirling motion of the gaseous products of combustion and residues, as shown in FIG. 5. The longitudinal separator tubes 750 terminate at a bottom 758 with a bottom cap 760 near the end 728 of the hollow cylindrical tube 720, as shown in FIG. 4.

Figure 10:
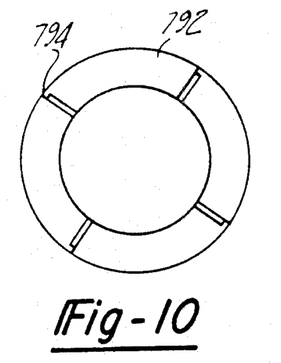
FIG. 10 is a plan view of the ring in the annulus of the separator.

The end 728 of the hollow cylindrical tube 720 is mounted within a seal 708 in the housing 710. At the end 728 of the hollow cylindrical tube 720, a plurality of holes 726 connect the flow passages 751 with the outer flow passage 780. The plurality of longitudinal slots 740 serve to cause the swirling gaseous products of combustion and residues flowing out of the combustor inner flow passage 490 and the outer flow passage 780 to take a sharp turn from the outer flow passage 780 in through the longitudinal slots 740 in the hollow cylindrical tube 720. Thus, the gaseous products of combustion and residues from the outer flow passage 780 flow in through the longitudinal slots 740. The gaseous products of combustion then flow in through the gaps 756, which causes a rapid change in direction. This rapid change in direction causes a substantial portion of the heavier residues to separate from the gaseous products of combustion and, thus, flow into the longitudinal first opening 752, into the flow passage 751 and then drop to the bottom 758 of the longitudinal separator tubes 750, then through the holes 726 and into the annulus 790 which is formed at the bottom of the outer flow passage 780. A ring 792, formed with a plurality of radial slots 794, is fitted within the annulus 790 to retain the residues in the annulus 790, as shown in FIG. 10. As shown in FIGS. 1 and 2, a plenum 796 is connected through a plurality of holes 797 to the annulus 790. The collected residues are discharged out of the annulus 790 through the holes 797 into the plenum 796 and then discharged out of the engine through a discharge valve 798. The cleaned gaseous products of combustion flow into an interior flow passage 770 of the hollow cylindrical tube 720 into a tangential inlet entry passageway 802 which is connected to a turbine plenum chamber 804 of the turbine engine. The separated residues and a predetermined quantity of gaseous products of combustion flow through the annulus 790 and through the holes 797 into the plenum 796. The gaseous products of combustion are permitted to flow from the annulus 790 through the plenum and a passage 799 and then into the leading edge 832 of the stator 830 of the power turbine 840, as shown in FIGS. 1 and 2.

The cleaned gaseous products of combustion and the remaining harmless residues flow from the turbine plenum chamber 804 into the nozzle 810 of the turbine 800, as shown in FIG. 2. The turbine 800 includes the nozzle 810 which is mounted axially in spaced relation with the gas generator turbine 820, the stator 830, the power turbine 840 and an exhaust outlet of the power turbine 840 which is connected to an exhaust duct 380, as shown in FIG. 1.

OPERATION

The operation of the combustor 400, the fuel injector 500, the fuel control 550, the ignitor 600, and the inertia separator 700 will now be described. As shown in FIG. 1, high pressure compressed oxidizing fluid from the discharge portion 220 of the compressor 200 is directed through the tubular conduit 250 into the heat exchanger 300. In the heat exchanger 300, the compressed fluid is heated, as it flows into the fluid inlet header 310 then through the passages 340, by the exhaust fluid which flows in the passages 330 connected to the exhaust duct 380 from the outlet of the power turbine 840, as is well known in the prior art.

Figures 6, 7, 8:
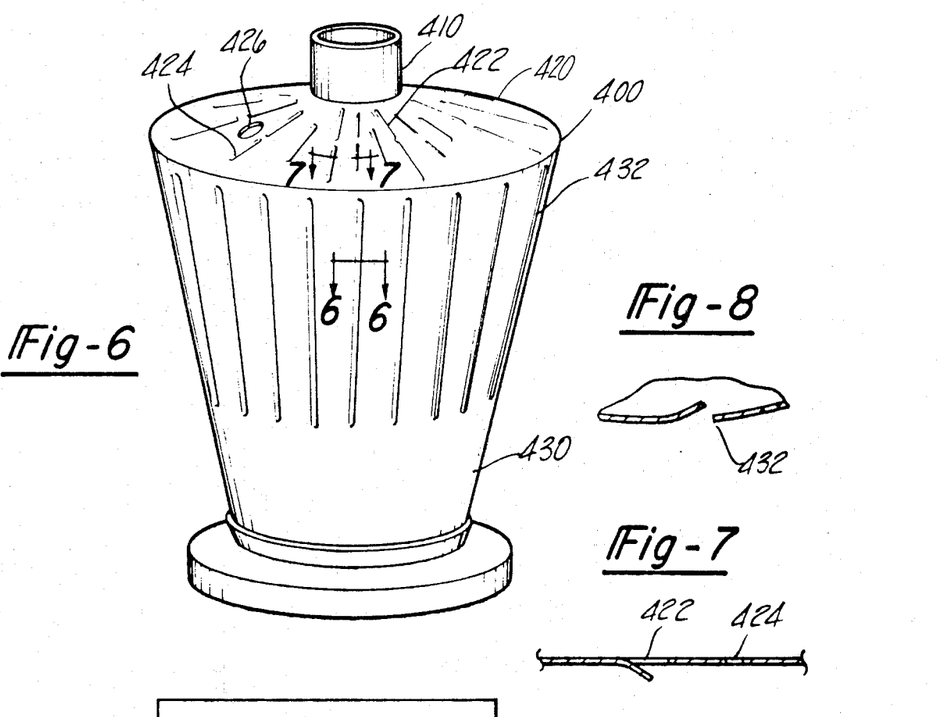
FIG. 6 is a perspective view of the combustor.
FIG. 7 is an enlarged sectional view of the combustor taken along line 7—7 of FIG. 6.
FIG. 8 is an enlarged sectional view taken along line 6—6 of the combustor in FIG. 6.

The heated compressed fluid is then directed from the heat exchanger 300 through the inlet duct 390 into the tangential entry port 392 of the combustor 400 as shown in FIG. 3. From the tangential entry port 392, the heated compressed fluid flows in a predetermined swirling motion into a flow passage 405 formed between the combustor 400 and the combustor housing 402, as shown in FIG. 4. The heated compressed oxidizing fluid flows through the plurality of radial and longitudinal louvers 422 and 432, and the slots 424 formed in the combustor 400, as shown in FIGS. 4 and 6. The radial louvers 422 in the truncated conically shaped dome 420 and the longitudinal louvers 432 in the secondary tube section 430 are oriented on the combustor 400 so as to inject the compressed fluid from the flow passage 405 into the interior flow passage 490 and to maintain the same swirling motion in the flow passage 405 as in the interior flow passage 490. The slots 424 inject compressed fluid into the interior flow passage 490 so as to promote flow turbulence and thus promote mixing and combustion of the fuel.

As shown in FIG. 9, pressurized solid fuel from a solid fuel pulverizer (not shown) is connected to the fuel control 550, which is then connected to the inlet port 542 of the fuel injector 500. Oxidizing fluid is fed into the injector through the second leg 545 of the solid fuel supply inlet port 542, where the fluid mixes with the pulverized solid fuel in the solid fuel supply inlet port 542 and flows into the annular chamber 530 of the fuel injector 500 and downwardly towards the first and second serrations 546 and 514. The fluid pressure in the annular chamber 530 is maintained by the oxidizing fluid pressure booster 270 at a predetermined fluid pressure, which is higher than the fluid pressure in the interior flow passage 490 of the combustor 400. Thus, the pulverized solid fuel particles in the annular chamber 530 are forced into and through the serrations 514 and 546 by the pressure differential between the pressure in the annular chamber 530 and the pressure in the interior flow passage 490. Since the second serrations 514 on the disc 510 are rotated with respect to the first serrations 546 on the flange 544, any fuel particles coagulated by humidity or any other source are forced into the serrations 514 and 546 and are repulverized. The repulverized fuel is then radially injected into the interior flow passage 490 of the combustor 400 by the first serrations 546 of the disc 510 and the pressure differential between the fluid pressure in the annular chamber 530 and the interior flow passage 490. The repulverized fuel particles are distributed in the combustor 400 so as to be radially injected into the interior flow passage 490 with a swirling motion that is opposite the swirling motion of the compressed oxidizing fluid. The fuel particles are thus given greated residence time for completing the combustion process in the combustor than would be possible without the swirling motion. It is obvious to those skilled in the art that any combustible solid matter that is capable of being shredded, pulverized, ground, micronized or granulated is suitable for use with my invention. Thus, any plant matter or fossil fuel may be used as solid fuel in this invention.

The repulverized solid fuel that is radially injected into the combustor 400 mixes with the compressed oxidizing fluid that is injected into the truncated conically shaped dome 420 of the combustor 400 through the radial louvers 422 and the slots 424 to form a combustible mixture of fuel and oxidizing fluid, as shown in FIG. 4. The radial louvers 422 inject the compressed oxidizing fluid from the flow passage 405 in a semi-turbulent flow mode into the interior flow passage 490 in the truncated conically shaped dome 420.

Thus, a swirling film of semi-turbulent compressed oxidizing fluid from the radial louvers 422 forms near the truncated conically shaped dome 420 in the interior flow passage 490 and acts to cool the surface of the dome 420. The slots 424 also inject compressed fluid from the flow passage 405 into the interior flow passage 490 in a manner so as to turbulate the fluid flow from the radial louvers 422 and to thus promote local turbulence. This local turbulence promotes mixing the oxidizing fluid with the repulverized solid fuel particles such that, in the presence of the ignitor 600 or other ignition source (i.e. heat or flame) they combine to form gaseous products of combustion and solid residues. This mixing zone is called the primary combustion zone.

The longitudinal louvers 432 inject compressed fluid from the flow passage 405 into the interior flow passage 490 in a laminar flow mode along the secondary tube to cool the secondary tube section 430 in the same swirling motion as the radial louvers 422 formed along the interior flow passage 490. The longitudinal louvers 432 also serve to inject relatively cooler oxidizing fluid from the flow passage 405 in a swirling motion into the interior flow passage 490 to reduce the temperature level of the truncated conically shaped dome 420 and the secondary tube section 430. Injecting the swirling oxidizing fluid in the dome 420 helps to increase the residence time of the radially injected fuel particles, which are swirling in the opposite swirl direction. In the secondary tube section 430, the temperature level of the gaseous products of combustion and the unburnt fuel residues are reduced, by the fluid injected by the longitudinal louvers 432, to a temperature that is compatible with the temperature capabilities of the inertia separator 700 and the turbine 800.

Since it is easier to burn liquid or gaseous fuels, it is within the scope of the invention to initiate the combustion process in the combustor 400 with either gaseous or liquid fuels from the injector 500. Once the combustion process is self-sustaining on the liquid or gaseous fuels, the fuel control 550 is made to start the flow of solid fuel into the injector 500 and to gradually reduce or shut off the liquid or gaseous fuel to the fuel injector. It is also within the scope of this invention to use liquid or gaseous fuel to provide for additional fuel in order to meet varying load or power conditions or to prevent flame out of the combustion process while operating on repulverized solid fuel. It is also obvious to those skilled in the art that a liquid or gaseous fuel pilot flame from the fuel injector 500 may be maintained in the interior flow passage 490 to assist in stabilizing the combustion of the repulverized solid fuel and the oxidizing fluid.

As stated above, the gaseous products of combustion and solid residues flow from the interior flow passage 490 of the combustor 400 in a swirling motion. This same swirling motion is carried into the outer flow passage 780 of the inertia separator 700. The orientation of the longitudinal slots 740 in the hollow cylindrical tube 720 of the inertia separator 700, with respect to the swirling flow motion of the products of combustion, is such that an approximately 180 degree turn in the flow path is required in order for the products of combustion to flow through the longitudinal slots 740 and the gap 756 and, thence, into the interior flow passage 770 of the hollow cylindrical tube 720, as shown in FIG. 5. The rapid change in direction causes a substantial portion of the solid residues to leave the gas stream by inertia. The separated solid fuel residues flow through the longitudinal slot 740 and then the longitudinal first opening 752 into the tube 750, where the residues are trapped and fall to the bottom of the flow passage 751 by gravity due to their greater weight than the gas stream, are directed out through the holes 726, and are collected in the annulus 790. The separation of the fuel residues is also assisted by a predetermined bleed of gaseous products of combustion gases into the annulus 790, as will be discussed in detail later. It is also possible for some of the solid residues to separate from the gas stream in the flow passage before entering the inertia separator 700. These residues would fall by gravity and are collected in the annulus 790. The ring 792 with the plurality of radial slots 794 fits within the annulus 790 and acts to hold the collected residues within the annulus. The plenum 796 is connected to the annulus 790, as by the holes 797 and, then, out of the engine through the discharge valve 798. Thus, residues collected in the annulus 790 are held down by the ring 792, which keeps the residues from leaving. Thus, the residues fall through the holes 797 and then into the plenum 796 and then out through the discharge valve 798.

As shown in FIGS. 1 and 2, the clean products of combustion flow into a tangential inlet entry passageway 802 and, thence, into the turbine plenum chamber 804. The cleaned gaseous products of combustion and remaining harmless residues flow from the turbine plenum chamber 804 into the nozzle 810 of the turbine 800, through the gas generator 820, then through the stator 830 and the power turbine 840, then into the exhaust outlet 850 of the turbine 800 and then into the exhaust duct 380.

A predetermined quantity of gaseous products of combustion is permitted to be drawn into the plenum 796 through the holes 797 to aid in the withdrawing of residues from the annulus 790. The gaseous products of combustion flow from the plenum 796 into the passage 799 and then to the leading edge 832 of the stator 830 of the power turbine 840. Since the air flows through the passage 799, little or no residue will be entrained by the products of combustion.

Additional exhaust separator means can be installed between the power turbine outlet and the heat exchanger 300 to reduce the emission of solid residues from the engine.

In addition, an alternate electrostatic precipitator downstream of the heat exchanger 300 can also be provided to further reduce the emission of solid residues from the engine.

While the invention is described in connection with a preferred embodiment, it will be understood that it is not intended to limit the invention to that embodiment. On the contrary, it is intended to cover all alternatives, modifications and equivalents as may be included within the spirit and scope of the invention, as defined by the appended claims.

What I claim is:

1. A method for burning pulverized solid fuel with oxidizing fluid and for removing solid residues from the products of combustion, said method comprising the steps of:

introducing pulverized solid fuel into a fuel injector mounted to a combustor;

grinding and metering said pulverized solid fuel in said fuel injector to a ground pulverized solid fuel of a predetermined particle size;

injecting said ground pulverized solid fuel along a plane substantially radial of said fuel injector into a combustion chamber in said combustor, said injecting of said ground pulverized solid fuel further imparting a tangential velocity component to said solid fuel within said radial plane as said ground pulverized solid fuel exits said fuel injector;

introducing swirling preheated oxidizing fluid into said combustion chamber such that swirling preheated oxidizing fluid crosses said radially injected ground pulverized solid fuel in said combustion chamber;

mixing said injected ground pulverized solid fuel with said swirling preheated oxidizing fluid to form a swirling combustible mixture in said combustion chamber;

igniting said swirling combustible mixture in said combustion chamber to form swirling gaseous products of combustion in said combustion chamber and solid residues suspended in said swirling gaseous products of combustion;

passing said swirling gaseous products of combustion and solid residues along an inertia separator; and separating said solid residues from said swirling gaseous products of combustion in said inertia separator.

2. The method of claim 1 further comprising the step of introducing liquid fuel into said fuel injector prior to said step of introducing said pulverized solid fuel into said fuel injector.

3. The method of claim 1 further comprising the step of introducing gaseous fuel into said fuel injector prior to said step of introducing said pulverized solid fuel into said fuel injector.

4. The method of claim 1 further comprising after said separating step the steps of collecting and storing said solid residues.

5. The method of claim 1 further comprising after said separating step the step of passing said separated gaseous products of combustion to an inlet for a turbine engine.

6. The method of claim 1 further comprising the step of pressurizing said fuel injector to a predetermined pressure prior to said step of introducing said pulverized solid fuel into said fuel injector.

7. The method of claim 1 wherein:

said introducing step further comprises introducing said pulverized solid fuel into a chamber formed between an inner body and an outer body of said fuel injector, said inner body being rotatably mounted with respect to said outer body; and said grinding step further comprises repulverizing said pulverized solid fuel by grinding said pulverized solid fuel between first grinding means formed integrally with said inner body and second grinding means formed integrally with said outer body.

8. A method for burning pulverized solid fuel with oxidizing fluid and for removing solid residues from the products of combustion, said method comprising the steps of:

introducing pulverized solid fuel into a fuel injector mounted to a combustor;

grinding and metering said pulverized solid fuel in said fuel injector to a ground pulverized solid fuel of a predetermined particle size;

injecting said ground pulverized solid fuel along a plane substantially radial of said fuel injector into an inner flow passage of said combustor, said injecting of said ground pulverized solid fuel further imparting a tangential velocity component to said fuel within said radial plane as said ground pulverized solid fuel exits said fuel injector;

preheating oxidizing fluid to form preheated oxidizing fluid;

pressurizing said preheated oxidizing fluid to form pressurized preheated oxidizing fluid;

introducing pressurized preheated oxidizing fluid into an outer flow passage of said combustor, said outer flow passage surrounding said inner flow passage, such as to form swirling preheated oxidizing fluid;

supplying said swirling preheated oxidizing fluid to said inner flow passage;

mixing said ground pulverized solid fuel with said swirling preheated air to form a combustible mixture in said inner flow passage;

igniting said combustible mixture in said inner flow passage to form gaseous products of combustion in said combustion chamber and solid residues suspended in said gaseous products of combustion;

passing said swirling gaseous products of combustion and solid residues along an inertia separator, and separating said solid residues from said swirling gaseous products of combustion in said inertia separator.

9. The method of claim 8 wherein said step of supplying said swirling preheated oxidizing fluid to said inner flow passage further comprises passing a portion of said swirling preheated oxidizing fluid through a plurality of longitudinal slots formed in a tubular wall separating said inner and outer flow passages of said combustor.

10. The method of claim 9 wherein said step of supplying said swirling preheated oxidizing fluid to said inner flow passage further comprises passing another portion of said swirling preheated oxidizing fluid through a plurality of transverse slots formed in a dome interconnected with one end of said tubular wall of said combustor.

11. The method of claim 8 further comprising the step of introducing liquid fuel into said fuel injector prior to said step of introducing said pulverized solid fuel into said fuel injector.

12. The method of claim 8 further comprising the step of introducing gaseous fuel into said fuel injector prior to said step of introducing said pulverized solid fuel into said fuel injector.

13. The method of claim 8 further comprising after said separating step the steps of collecting and storing said solid residues.

14. The method of claim 8 further comprising after said separating step the step of passing said separated gaseous products of combustion to an inlet for a turbine engine.

15. The method of claim 8 further comprising the step of pressurizing said fuel injector to a predetermined pressure prior to said step of introducing said pulverized solid fuel into said fuel injector.

16. The method of claim 8 wherein:

said introducing step further comprises introducing said pulverized solid fuel into a chamber formed between an inner body and an outer body of said fuel injector, said inner body being rotatably mounted with respect to said outer body; and said grinding step further comprises repulverizing said pulverized solid fuel by grinding said pulverized solid fuel between first grinding means formed integrally with said inner body and second grinding means formed integrally with said outer body.

* * * * *

UNITED STATES PATENT AND TRADEMARK OFFICE
CERTIFICATE OF CORRECTION

PATENT NO. : 4,550,563

DATED : November 5, 1985

INVENTOR(S) : William C. Marchand

It is certified that error appears in the above-identified patent and that said Letters Patent is hereby corrected as shown below:

Column 5, line 5, delete "sectional partial" and insert ---- partial sectional ----.

Column 9, line 57, delete "greated" and insert ---- greater ----.

In The Claims

Column 13, line 26, delete ", and" and insert ---- ; and ----.

Signed and Sealed this

Eleventh Day of March 1986

[SEAL]

Attest:

DONALD J. QUIGG

Attesting Officer

Commissioner of Patents and Trademarks